United States Patent [19]

D'Amato

[11] Patent Number: 4,627,684
[45] Date of Patent: Dec. 9, 1986

[54] HOUSING FOR ELECTRICAL CONNECTORS
[75] Inventor: Michael J. D'Amato, North Haven, Conn.
[73] Assignee: Harvey Hubbell Incorporated, Orange, Conn.
[21] Appl. No.: 633,467
[22] Filed: Jul. 23, 1984
[51] Int. Cl.⁴ .............................................. H01R 13/46
[52] U.S. Cl. .......................... 339/206 R; 339/210 R; 339/122 R; 339/47 R; 339/176 MF; 174/66
[58] Field of Search .......... 339/206 R, 210 R, 210 M, 339/17 F, 122 R, 122 F, 176 MF, 198 H, 47 R, 49 R, 119 R, 125 R; 174/65 R, 66, 48, 49, 72 C

[56] References Cited

U.S. PATENT DOCUMENTS

| | | | |
|---|---|---|---|
| 2,840,691 | 6/1958 | Bobrick et al. | 339/122 F |
| 3,002,177 | 9/1961 | Bundy | 339/198 J |
| 3,335,214 | 8/1967 | Brotherhood | 174/48 |
| 3,491,327 | 1/1970 | Tait et al. | 174/48 |
| 3,999,160 | 12/1976 | McDonnell | 339/119 R |
| 4,088,827 | 5/1978 | Kohaut | 174/48 |
| 4,289,370 | 9/1981 | Storck | 339/176 MF |
| 4,426,126 | 1/1984 | De Vos et al. | 339/125 R |
| 4,461,523 | 7/1984 | Ustin et al. | 339/42 |
| 4,463,998 | 8/1984 | Reavis et al. | 339/122 R |
| 4,470,656 | 9/1984 | Moser et al. | 339/122 R |

Primary Examiner—Gil Weidenfeld
Assistant Examiner—Thomas M. Kline
Attorney, Agent, or Firm—Jerry M. Presson; Walter C. Farley

[57] ABSTRACT

Upper and lower molded polymeric housing portions are coupled together to form a closed housing. Each housing portion has an end wall, the end wall of one having openings for a power receptacle and the end wall of the other having either knock-outs to form openings for a power receptacle or knock-outs to form openings for communication connectors. A hook and groove arrangement permits the housing portions to be coupled together and moved between open and closed positions. The housing is especially useful with flat cable in an under-carpet wiring system.

5 Claims, 16 Drawing Figures

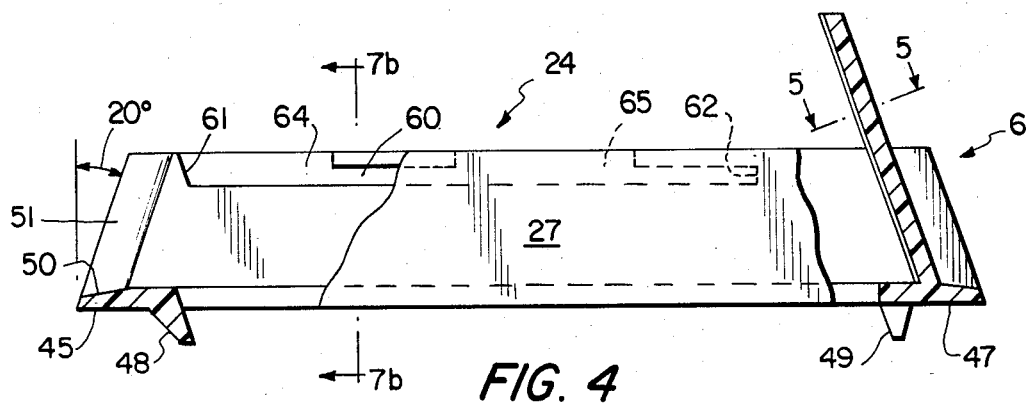
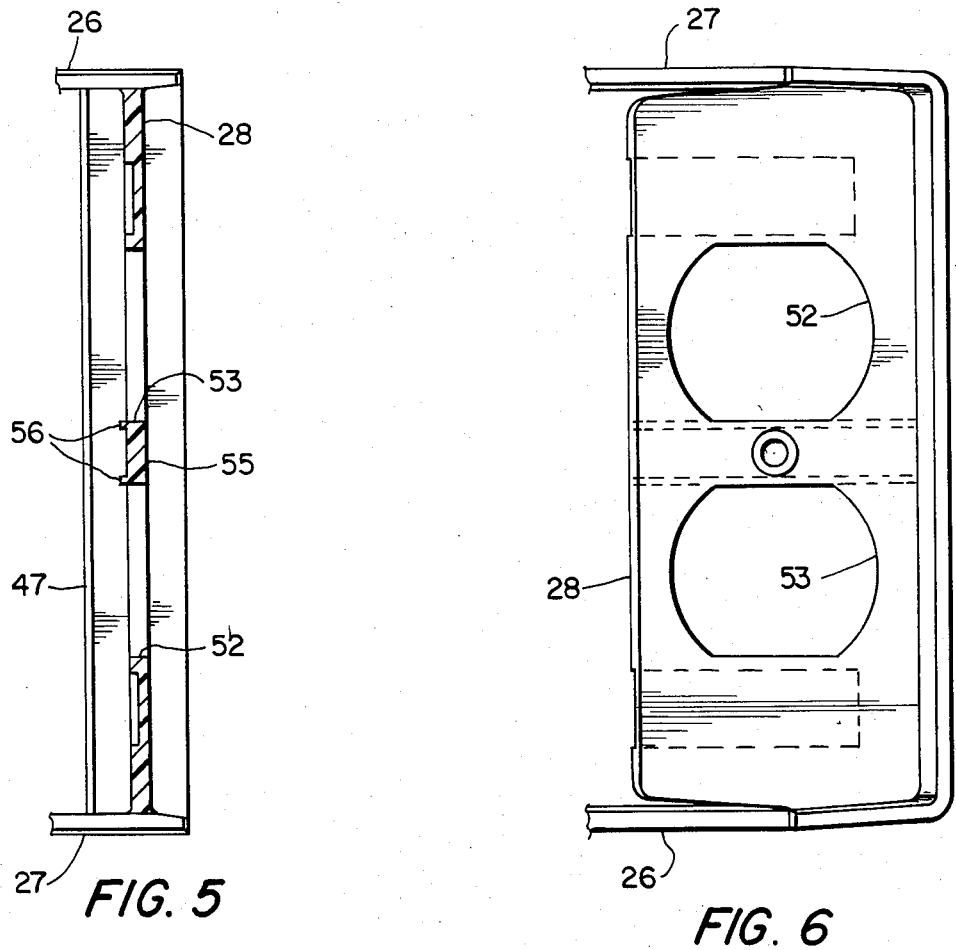
FIG. 4
FIG. 5
FIG. 6

HOUSING FOR ELECTRICAL CONNECTORS

This invention relates to a housing mountable on a floor or other surface to contain connection devices particularly for use with a flat cable wiring system for providing wiring in locations such as beneath floor carpet.

BACKGROUND OF THE INVENTION

It is common practice to provide a housing of some sort to receive cables emerging through or along a floor and to support electrical devices to which those cables are connected. For example, in many offices there are cable ducts constructed in the building floors and, when a desk or other form of work station is to be positioned adjacent one of those ducts, an opening is formed or re-opened into the duct, a cable is pulled through or accessed through the opening and a connector such as a conventional receptacle is attached to the cable. A housing meeting applicable standards established by the National Electrical Code (NEC), Underwriters Laboratories (UL) or the like is required to house the electrical devices and terminations to prevent accidental contact with electrically energized components and to protect the electrical components from mechanical abuse. The housing must also provide for ready access to the connecting devices housed therein by the user. Further, the housing must present an attractive appearance and it is desirable for it to have a low profile so that it is unobtrusive and so that it can fit under furniture or other work equipment.

With the advent of flat cables and the development of under-carpet wiring systems, different forms of housings have become necessary, as well as different forms of connectors. However, those which have appeared have not been totally satisfactory or, in some cases are so totally integrated with a specific form of connector as to be quite inflexible and not usable with other cable systems.

BRIEF SUMMARY OF THE INVENTION

Accordingly, an object of the present invention is to provide a housing which can accommodate flat cable means for connecting the cable conductors to other cables or wires.

A further object is to provide a housing which has access openings for an electrical receptacle at one end and has interchangeable top portions to permit conversion of the housing between power and communication connectors, or no connectors, at the other end.

Another object is to provide such a housing having exposed portions which can be molded from a polymeric material such that the components thereof are easily assembled and opened for access.

Yet another object is to provide a housing in which top and bottom portions are each unitarily and integrally formed with end plates having openings or knock-outs, the top and bottom portions having unitarily formed coupling arrangements so that no fasteners between the coupling portions themselves are needed.

Briefly described, the invention includes an electrical connector housing having a lower housing portion with a generally rectangular base frame having a central opening, first and second side walls extending upwardly from opposite sides of the base frame and terminating at upper edges, and a first end wall extending inwardly and upwardly from a third side of said base frame. The end wall extends somewhat beyond the upper edges and has openings therethrough to provide access to an electrical connector device and an attachment hole. A second, upper, housing portion has a generally rectangular top plate with third and fourth side walls extending downwardly from opposite side edges of the top plate and terminating at lower edges. A second end wall extends downwardly and outwardly from a third edge of the top plate somewhat beyond said lower edges. The second end wall can be blank or it can have weakened zones defining knockouts which are selectively removable to form openings for receiving electrical connector devices. The upper and lower housing portions can be joined by hooks extending beyond the lower edges of the first and second side walls and grooves extending longitudinally along the upper edges of the third and fourth side walls for receiving the hooks and permitting relative sliding motion of the upper and lower housing portions between a closed position in which the second end wall is adjacent the fourth side of the base frame and the first end wall is adjacent the fourth edge of the top plate and an open position in which the first end wall is spaced from the top plate to permit access to the interior of the housing.

Alternatively, the hooks can be provided on the lower housing and the grooves can be in the side walls of the upper housing.

The housing assembly preferably includes a metal frame which serves as a mounting structure and has a base plate dimensioned to be received in the central opening of the base frame, and side walls extending upwardly from the base plate in substantially parallel relationship with the first and second side walls. The side walls of the metal frame have mounting tabs extending inwardly toward each other at their ends, each mounting tab having a mounting hole to accommodate an electrical device or support plate.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein:

FIG. 4 is a side elevation, partially in section, at the lower portion of a housing in accordance with the invention;

FIG. 5 is a partial sectional view along line 5—5 of FIG. 4;

FIG. 6 is an end view in the direction of arrow 6, FIG. 4;

DETAILED DESCRIPTION OF PREFERRED EMBODIMENTS

Figure 1:
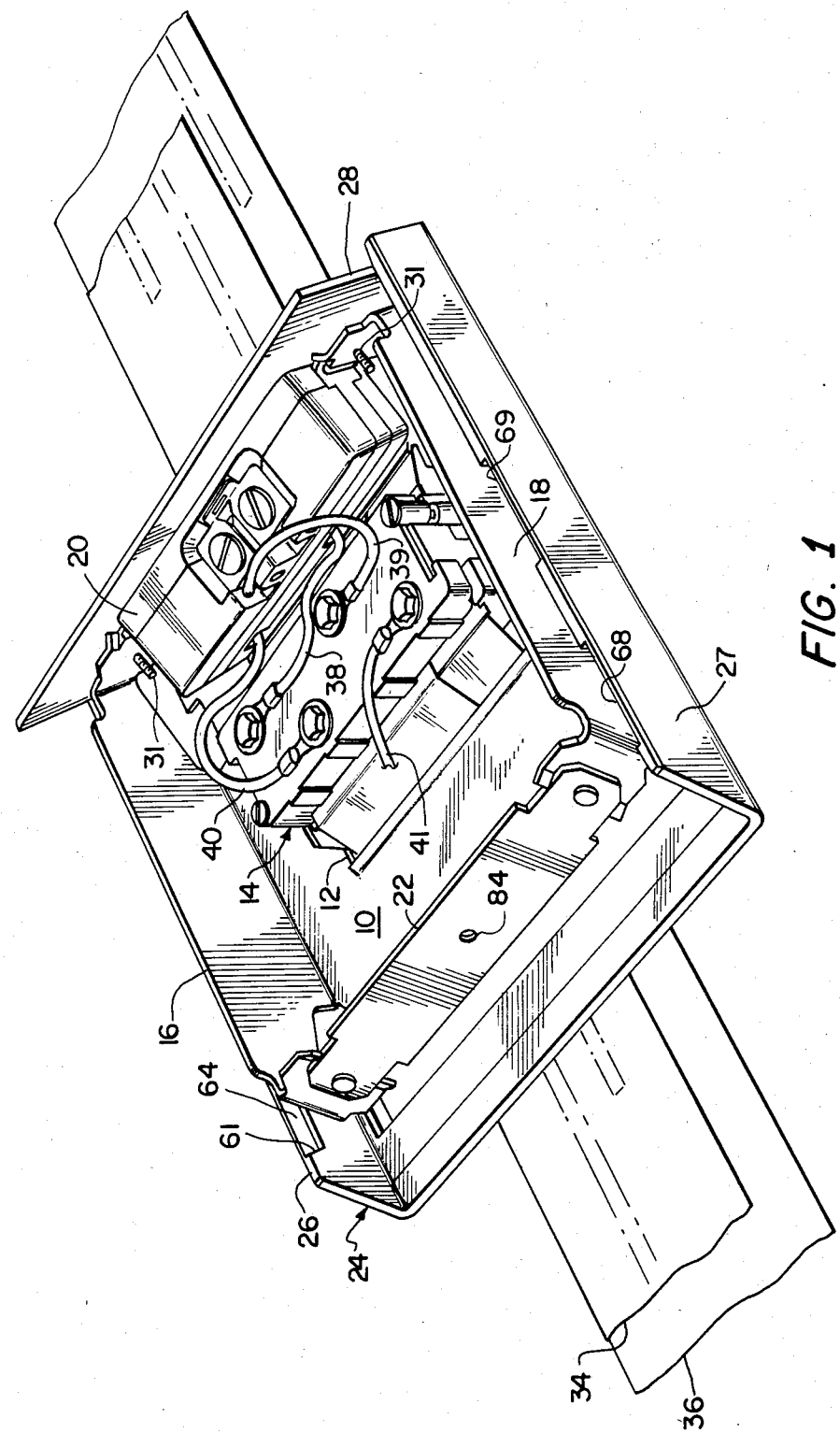
FIG. 1 is a perspective view of a portion of a housing in accordance with the present invention used in conjunction with connector devices and flat cable.
Figure 2:
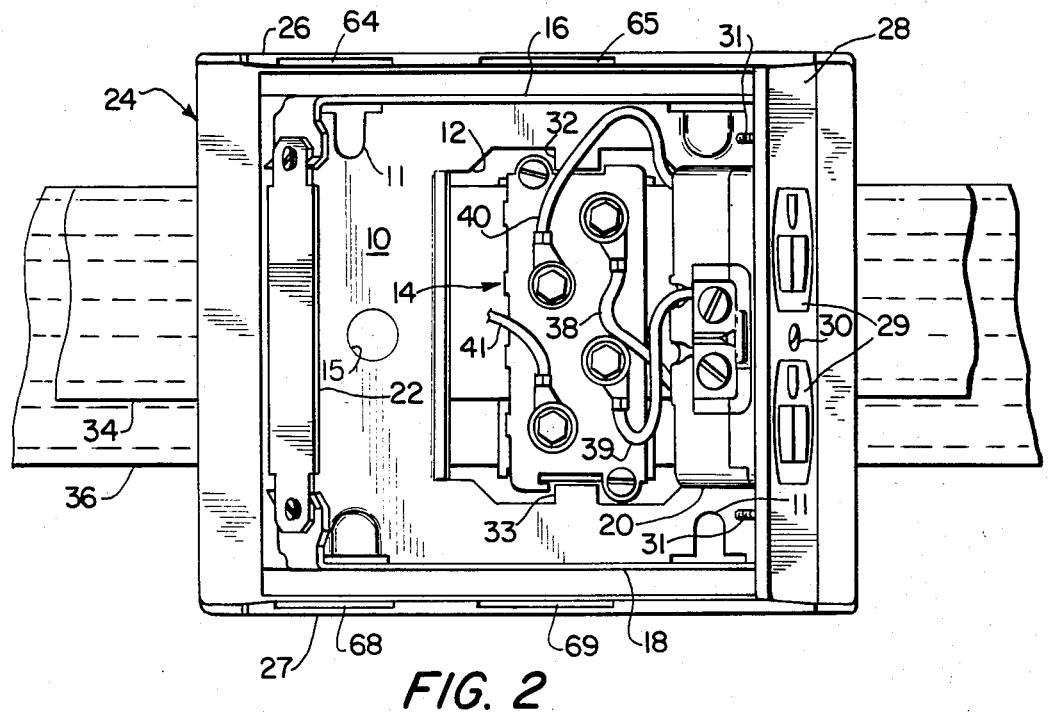
FIG. 2 is a top plan view of the apparatus of FIG. 1.
Figure 3:
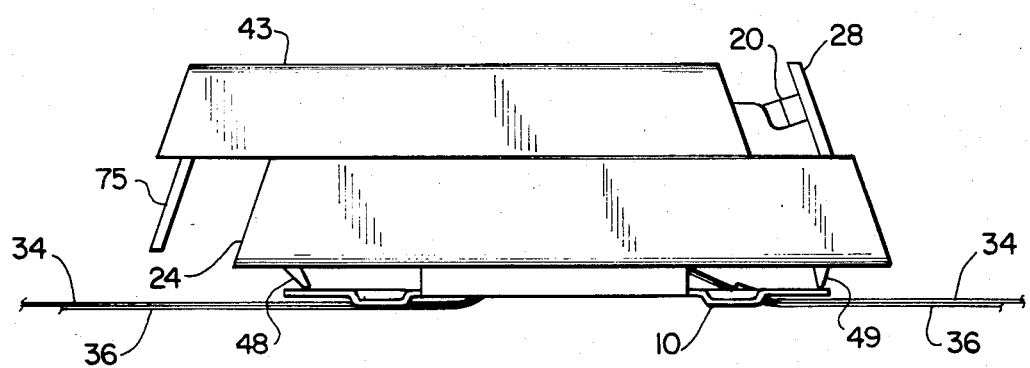
FIG. 3 is a side elevation of the apparatus of FIGS. 1 and 2 with the upper portion of the housing thereof in place.

FIGS. 1, 2 and 3 show perspective, top plan and side elevations of a housing apparatus in accordance with the invention in a partially assembled form substantially as it would appear in a use location during installation. The upper portion of the housing is omitted from FIGS. 1 and 2 so that the interior can be seen. The assembly includes a metal frame having a base plate 10 which can be attached to the surface on which it is being mounted. Most often, this is a concrete or wooden floor on which there is or will be carpet. Plate 10 has openings 11 through which screws or other fasteners can pass and a central opening 12 to receive a transition or connector assembly 14, which is illustrated in a somewhat simplified form. Plate 10 also has an opening 15 which can be connected to a standard nipple or which can be used as a cable passage, and upstanding side walls 16 and 18, the opposite ends of which are bent inwardly so as to extend toward each other and define a gap in which a receptacle or other electrical device can be mounted.

In the specific device illustrated, a conventional grounded receptacle 20 is mounted at one end of the metal frame in the gap between the side walls and a support plate 22 is mounted at the other end. Plate 22, in the illustration, is a mounting plate to which the upper portion of the housing can be attached. It can be replaced by a receptacle or any of a variety of devices, as desired. A first, lower housing portion indicated generally at 24 surrounds plate 10 and includes upwardly extending side walls 26 and 27 and a unitarily formed, inclined end wall 28. As will be recognized from FIG. 3, the inwardly bent ends of the side walls 16 and 18 are inclined at the same angle as wall 28 to make a solid connection and wall 28 is inclined to present a pleasing appearance and also to make the face of receptacle 20 more easily visible, particularly when the device is to be disposed adjacent a desk or the like. End wall 28 is provided with apertures to permit the usual bosses 29 on receptacle 20 to extend therethrough, the bosses being the portions which surround the openings of the receptacle which are spaced and dimensioned to receive mating plug blades. End wall 28 is attached to receptacle 20 by a screw 30 and the receptacle is, in turn, connected to the inwardly bent portions at the ends of the side walls by screws 31.

As best seen in FIG. 2, connector assembly 14 has vertically extending recesses at both ends to receive tongues 32 and 33 which extend toward each other from opposite sides of opening 12 in plate 10. The tongues loosely position connector 14 within the opening, allowing it some freedom to slide vertically.

Flat cables 34 and 36 extend beneath plate 10, pass through connector 14 and, in the particular arrangement shown, leave the opposite side. In the specific example shown, cable 34 is a three-conductor cable having flat conductors therein separated and covered by insulation material which bears a color code to identify the conductors. Cable 36 is a four-conductor cable similarly having flat conductors and color coding. Conductors of like color code are interconnected within connector 14 and they are also connected to wires 38, 39, 40 and 41 which are attached to the top of the connector. Three of those wires 38, 39 and 40 are attached to receptacle 20 which is therefore electrically powered by a branch circuit. The unused wire 41 is taped off but can be connected to a receptacle installed at the other end of the housing in place of plate 22, which receptacle could then be connected to the other branch of the power circuit.

As seen in FIG. 3, the assembly is completed by the insertion of a second, upper housing portion 43 which is made to mate with housing portion 24 as illustrated. The unitarily formed, inclined end of housing portion 43 is provided with punch-outs to form openings for an electrical device such as another receptacle. A different cover portion can be substituted, as will be described, with openings or punch-outs to receive a communicator connector or connectors so that the entire assembly can accommodate both power and communication lines. Housing portions 24 and 43 are both generally U-shaped and are preferably molded from a suitable polymeric material, such as an A.B.S. known as Cycolac, to present a pleasing appearance while being sturdy and impact resistant.

As will be recognized from the above, one function of this apparatus is to connect the conductors of a flat cable to conventional wires such as wires 38–41 which can be referred to as "round" wires which they normally are. The round wires can be either the input or output wires, i.e., they can be delivering power to the flat cable when used as a duct feed point or can be delivering power from the flat cable to a load.

A second function is to interconnect one multiconductor flat cable with another multiconductor flat cable having the same or a different number of conductors, and a third function is to provide a convenient connection station to terminate either or both of the power and communication cables needed at a work station, for example, in an office environment.

Figure 7A:
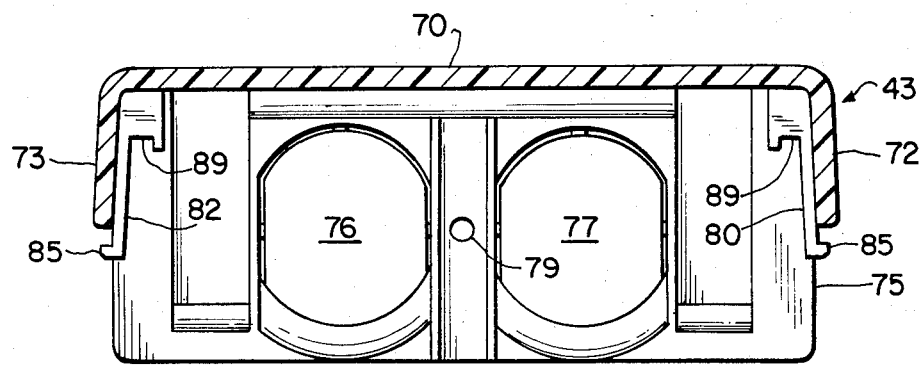
FIG. 7a is a sectional view along line 7a—7a of FIG. 8.
Figure 7B:
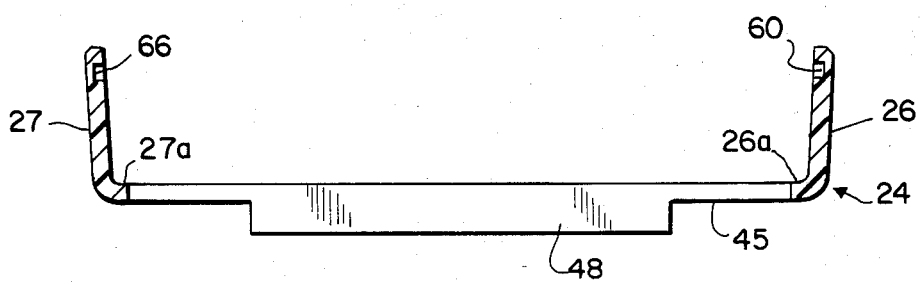
FIG. 7b is a sectional view along line 7b—7b of FIG. 4.

The lower housing portion 24 is shown in detail by itself in FIGS. 4,5,6 and 7b. As seen in FIGS. 4 and 7b, side walls 26 and 27 include inwardly extending portions 26a and 27a at the bottom thereof which form the side rails for a generally rectangular base frame having a transverse member 45 at one end thereof and a somewhat similar transverse member 47 at the other end. Member 45 has a downwardly extending leg 48 formed thereon and member 47 has a somewhat similarly shaped leg 49. As seen in FIG. 3, when housing portion 24 is used in connection with a base plate 10, legs 48 and 49 constitute spacing members to elevate housing portion 24 for carpet clearance. The upper surface of transverse member 45 includes a substantially horizontal portion and a downwardly sloping portion 50 which cooperates with the upper housing portion in the closed condition, as will be described. Walls 26 and 27 each have an outwardly sloping surface 51 at the end for a similar purpose.

Transverse member 47 is unitarily formed with and supports the upwardly extending end wall 28 which is inclined at an angle of about 20 degrees from the vertical. The front and rear edges of walls 26 and 27 are inclined at a similar angle. Sectional and front views of wall 28 are shown in FIGS. 5 and 6 from which it will be seen that the wall includes two openings 52 and 53 which are shaped to receive the standard configuration of bosses 29 protruding from the front of receptacle 20. A central support 55 between the openings has reinforcing ribs 56 and a hole 58 to receive screw 30 which attaches housing portion 24 to receptacle 20. Forming wall 28 unitarily with the remainder of the housing portion, i.e., as a single component in the same molding operation, has the advantages of obtaining an exact color match between the end and sides. There are also significant manufacturing and installation advantages because there need be no further provision for attaching the parts together. It should be noted at this point that the only fastener which interconnects housing portion 24 to the remainder of the structure is screw 30. However, the fit of openings 52 and 53 around the receptacle bosses firmly positions the housing portion so that no other positioning means is necessary. In addition, legs 48 and 49 provide support for the housing on either a plate 10 or on the floor or other surface on which the housing is used. It will also be observed that wall 28 extends above side walls 26 and 27 by an amount which is substantially equal to the remaining length of wall 28 above member 47.

The regions adjacent the upper edges of walls 26 and 27 are provided with grooves to cooperate with hooks on the upper housing portion for coupling the two housing portions together. As seen in FIGS. 2 and 4, and to some degree in FIG. 7b, a longitudinally extending groove 60 is formed in the region adjacent the upper edge of wall 26 on the inner surface thereof, the groove extending between a rear wall 61 and a front wall 62. Openings 64 and 65 extend upwardly and constitute upward extensions of groove 60 to permit hooks to be passed down into groove 60. A similar groove 66 is formed in wall 27 having openings 68 and 69, seen in FIG. 2.

Figure 8:
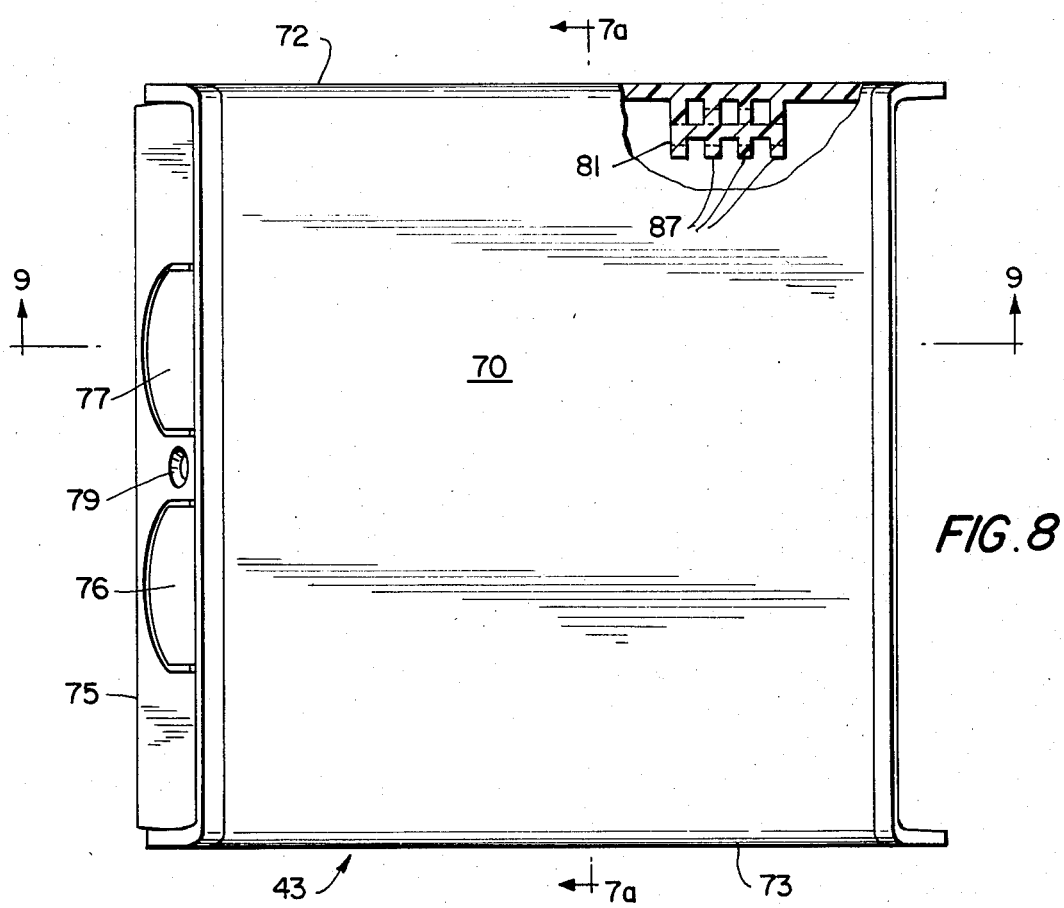
FIG. 8 is a top plan view, partially cut away and in section, of an upper portion of a housing in accordance with the invention.
Figure 9:
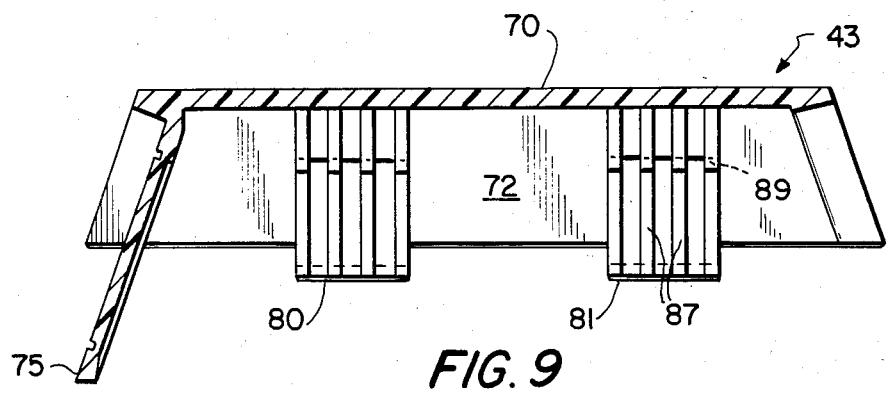
FIG. 9 is a side elevation, in section, along line 9—9 of FIG. 8.

An upper housing portion is shown in FIGS. 7a, 8 and 9 this being a housing portion 43 designed for use with a second power receptacle. In some respects, the upper housing portion is a mirror image of the lower, but there are rather significant differences. On such difference is the presence of a top plate 70 which forms the "roof" of the housing in the assembled condition. Side walls 72 and 73 extend downwardly from top plate 70, as does an end wall 75. End wall 75 is integrally and unitarily formed with the top and side walls for the same reasons described in connection with the lower housing portion and is inclined at a 20 degree angle relative to the edges of the side walls, in the same fashion as wall 28, and the end edges of the side walls are similarly inclined. Wall 75 is provided with molded weakened portions to define knock-outs 76 and 77 which can be left in place if no connector is to be mounted at that end of the housing, or which can be easily removed to provide openings similar to openings 52 and 53 to receive the bosses of a receptacle. Wall 75 is also provided with a hole 79 through which a fastening screw can be passed. If a receptacle is mounted at that end of the housing, the screw simply enters the normal central hole in the receptacle. If not, the screw enters a central hole 84 in plate 22. Wall 75 is also provided with reinforcing ribs as with wall 28.

A major difference in housing portion 43 from housing portion 24 is that portion 43 has no grooves but, instead, is provided with two sets of hook means which perform the function of cooperating with the grooves in housing portion 24 and also provide a resting support. The hook structures are formed on the side walls, preferably being unitarily molded therewith, and include hook structures 80, 81, 82 and 83, hooks 80 and 81 being adjacent wall 72. As seen in FIG. 7a, a portion of the hook structure protrudes below the lower edge of wall 72 and has an outward projection 85 which is dimensioned to be received in groove 60 and is also dimensioned in length to enter the appropriate one of grooves 64 or 65. The hook structure is provided with a series of reinforcing ribs 87 for stiffness. At the upper portion of each hook structure, each rib is formed into a downwardly opening hook shape 89 which can rest on the upper edges of walls 16 and 18 when the housing is used in conjunction with the inner assembly shown in FIG. 1.

Thus, to assembly the two housing portions, the upper housing portion 43 is positioned over the lower housing portion with wall 75 at the end opposite wall 28 and is then lowered so that hooks 80, 81 can enter openings 64, 65 and hooks 82, 83 can enter openings 68, 69, the hooks being dimensioned so that when they are fully seated in grooves 60 and 66, the upper and lower side wall edges of housing portions 24 and 43, respectively, are in or near an abutting, parallel relationship. At this stage, the housing portions are as illustrated in FIG. 3. Housing portion 43 can then be moved longitudinally, in a sliding motion, until wall 75 passes inwardly of the end edges of side walls 26 and 27 and end wall 28 passes inwardly of the adjacent end edges of side walls 72 and 73. This sliding movement is terminated when hook 81 reaches wall 62 at the end of groove 60 and when hook 83 reaches the similar end of groove 66.

As the housing portions approach this limit of movement, the lower distal edge of wall 75 makes sliding contact with sloping surface 50 of transverse member 45, and the upper end of wall 28 makes contact with a similar surface in the underside of top plate 70. At the same time, the side edges of end wall 75 contact surfaces 51 and the side edges of end wall 28 come into contact with similar slopes on the inside surfaces of walls 72 and 73. This provides a degree of frictional engagement which prevents the parts from easily slipping away from each other and is fully effective to keep the components from separating without an intentional manual effort.

Figure 10:
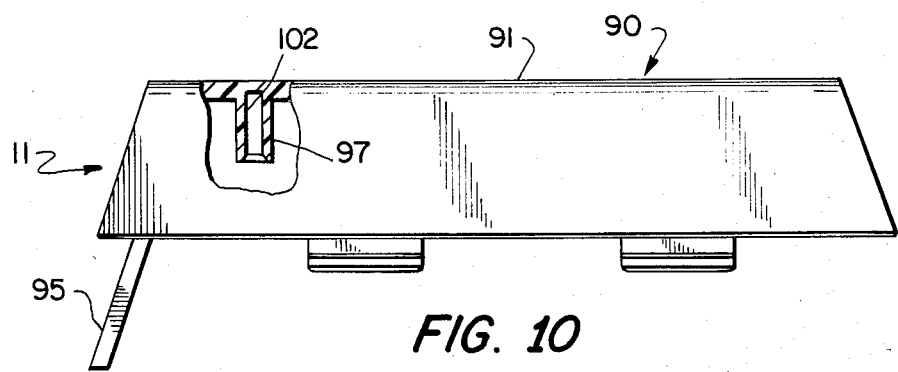
FIG. 10 is a side elevation, partially cut away and in section, of an alternative upper portion of a housing in accordance with the invention.
Figure 11:
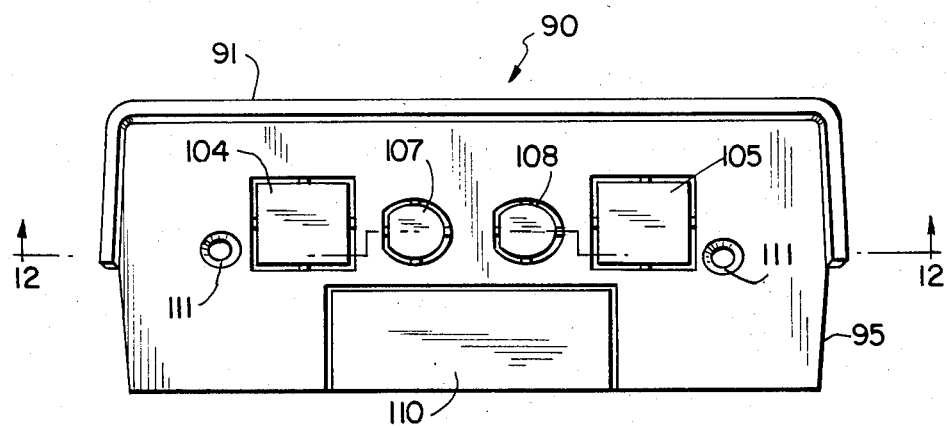
FIG. 11 is an end elevation of the housing portion of FIG. 10 in the direction of arrow 11.
Figure 12:
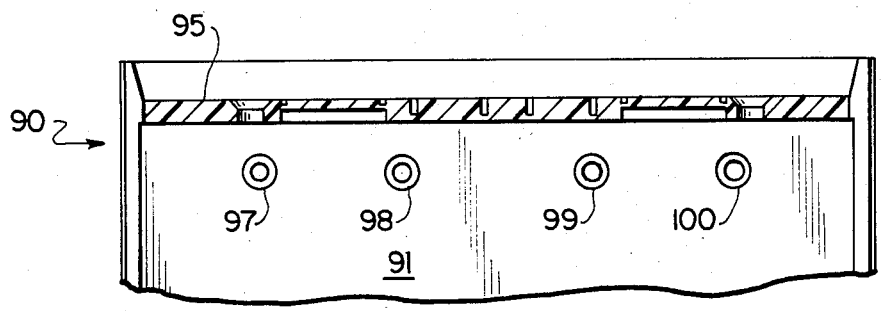
FIG. 12 is a sectional view along line 12—12 of FIG. 11.
Figure 13:
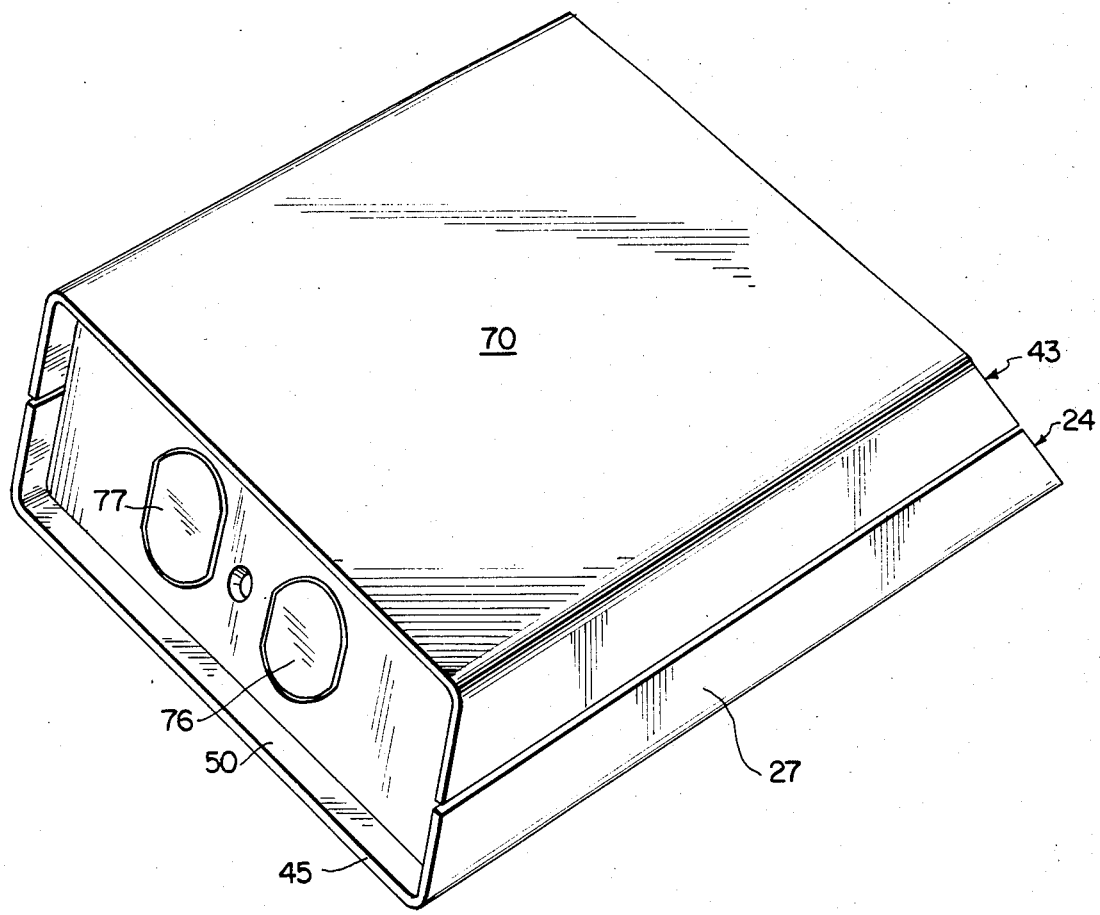
FIG. 13 is a perspective view of an assembled housing in accordance with the invention including the upper portion of FIGS. 10–12.

As previously indicated, it is possible to provide more than one kind of upper housing portion usable with a single lower housing portion if it is decided that the overall housing should be used for communication wires and connectors in addition to the power lines illustrated in FIGS. 1 and 2. If one or more communication connectors are to be used, plate 22 is removed. An upper housing portion 90 is then employed as illustrated in FIGS. 10, 11 and 12. The overall structure of housing portion 90 is substantially identical to housing portion 43 in having a top plate 91, side walls with hook structures 93, similarly shaped end portions, and an end wall 95. However, the knockouts provided in end wall 95 are significantly different and different mounting devices are provided for the communication connectors.

It will also be observed that the upper and lower housing portions are coupled together without the use of any separate fasteners such as screws, bolts or the like. While each housing portion can and frequently will be connected to some other mounting arrangement, there is no fastener other than the hook and groove arrangement between the portions themselves.

As seen in FIGS. 10 and 12, the inner surface of top plate 91 is provided with four unitarily molded cylindrical projections 97, 98, 99 and 100, projection 97 being shown in the cut-away portion of FIG. 10. As will be seen, each projection has an internal blind hole 102 to receive a threaded fastener, hole 102 being either internally smooth to receive a self-tapping screw or being threaded in advance. These projections can be connected to a mounting bracket to support the connector devices in their operative positions.

The knock-outs themselves are shaped and dimensioned to receive a variety of different kinds of connectors including telephone connectors, data couplers and the like. In particular, rectangular knock-outs 104 and 105 are shaped and dimensioned to receive inline telephone connectors, while D-shaped knock-outs 107 and 108 can be used for coaxial cable connectors. The larger rectangular knock-out 110 at the bottom is intended to receive a 2-for-1 telephone adapter which is a type of adapter in which a single incoming cable separates into two multi-conductor cables. Circular knock-outs 111 are for mounting screws.

Figure 14:
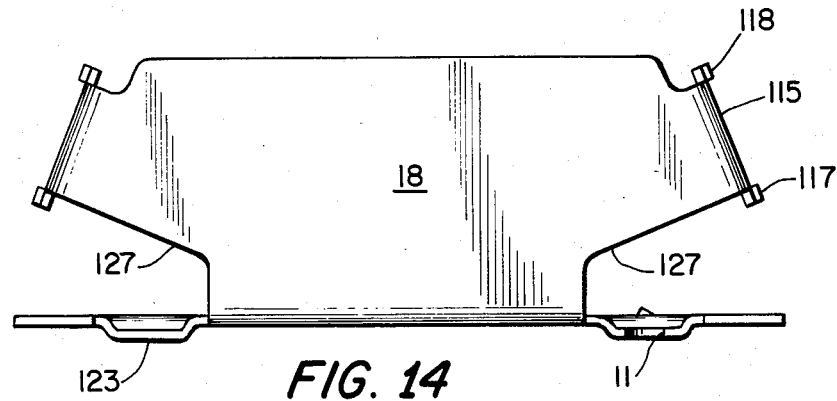
FIGS. 14 and 15 are side elevation and partially cutaway bottom plan views, respectively, of a metal frame portion of a housing in accordance with the invention.
Figure 15:
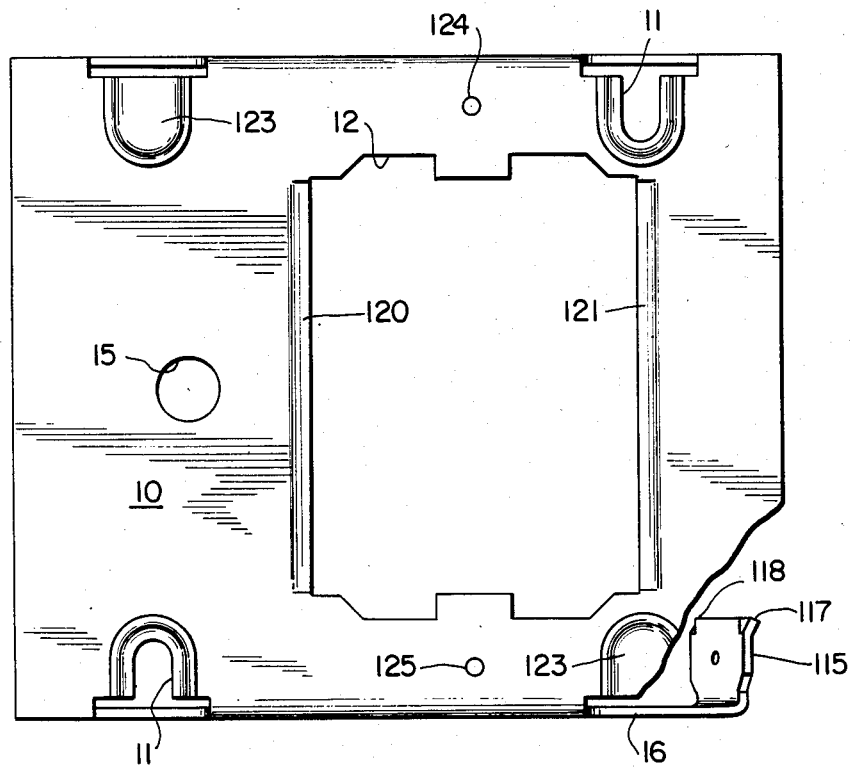

The metal frame is shown alone in FIGS. 14 and 15 in which it will be seen that plate 10 and walls 16 and 18 are cut and bent from a single piece of sheet metal. One of the tabs 115 is visible in the cut-away area of FIG. 15 and includes bent-out alignment ears 117 and 118 between which the mounting flange of an outlet is positioned as shown in FIG. 1. The opposite end margins of opening 12 are bent upwardly to form inwardly curved surfaces 120 and 121 to avoid sharp edges which might damage flat cable. Mounting holes 11 are formed in offset pads which form feet on which plate 10 is supported, the areas without holes being provided with similar pads 123.

Holes 124 and 125 are provided at opposite sides of opening 12 and are spaced apart by 3+9/32 inches, the proper spacing to accommodate a receptacle or similar connector device. This allows the housing to be mounted directly over a standard wall box and attached to the box using the mounting holes provided therein. When so mounted, opening 12 is directly in front of the open side of the box so that wires can extend from one housing to the other. These holes can also be used to mount a barrier to electromagnetically and physically separate the housing into power and data cable chambers.

Side walls 16 and 18 also have cut-out portions 127 to provide an entry point for data cables and also to provide areas where grounding clips can be attached to plate 10.

It will be recognized from the foregoing description that the elements of the metal frame and the upper and lower housing components cooperate to form a housing which encloses electrical terminations and makes them normally inaccessible (i.e., concealed) when in normal use, provides mechanical protection for the enclosed elements, provides a secure, fixed installation which can be attached to the floor, to a junction box or to a nipple leading to a duct or the like and contains, mounts and secures the power, data or telecommunication cables in such a way that they are available for use but protected from dirt and the like. In addition, the housing assembly is attractive in appearance and has no external assembly fasteners except for those at the ends directly associated with the mounting connectors, and it has a low profile to fit under various kinds of furniture and equipment.

The metal frame portion can be made of heavy, sturdy material with less concern for appearance because of the fact that, in normal use, it is totally concealed. It thus provides the basic security and strength to support and hold the electrical components as well as a grounding path. Furthermore, it is possible to provide other openings in addition to or instead of openings 12 and 15 to accommodate wires or cables of other sizes and types or other attachment devices, but this does not require any change to the structure of housing portions 24 or 43.

While certain advantageous embodiments have been chosen to illustrate the invention, it will be understood by those skilled in the art that various changes and modifications can be made therein without departing from the scope of the invention as defined in the appended claims.

I claim:

1. An electrical connector housing comprising
    a first lower housing portion having
        a generally rectangular base frame having a central opening therethrough,
        first and second side walls extending upwardly from opposite sides of said base frame and terminating at upper edges, and
        a first end wall sloping inwardly and upwardly from a third side of said base frame beyond said upper edges, said end wall having means defining openings therethrough to provide access to an electrical connector device and an attachment hole;
    a second upper housing portion having
        a generally rectangular top plate,
        third and fourth side walls extending downwardly from opposite side edges of said top plate and terminating at lower edges, and
        a second end wall sloping downwardly and outwardly from a third edge of said top plate beyond said lower edges; and
    means on said upper and lower housing portions for coupling said portions together to form a closed housing ends and with said first and second end walls at opposite ends and with said upper and lower edges of said side walls in substantially contiguous, abutting relationship, said means for coupling including
        hook means on one of said housing portions extending beyond the edges of the side walls of said one portion; and
        means defining inwardly opening grooves extending longitudinally along the inner surfaces and adjacent the edges of the side salls of the other housing portion for receiving said hook and permitting relative sliding motion of said upper and lower housing portions between a closed position in which said second end wall is adjacent the fourth side of said base frame and said first end wall is adjacent the fourth edge of said top plate and an open position in which said first end wall is spaced from said top plate to permit access to the interior of said housing, said grooves including
            stop means for establishing the relative locations of said housing portions in said open position, and
            upwardly extending grooves for receiving said hook means approaching in a downward direction.

2. A housing according to claim 1 and further comprising a metallic mounting structure including
a base plate dimensioned to be received in said central opening of said base frame;
fifth and sixth side walls extending upwardly from said base plate in substantially parallel relationship with said first and second side walls, each of said fifth and sixth side walls having opposite ends;
mounting tabs extending inwardly toward each other at the ends of said fifth and sixth side walls, each said mounting tab having a mounting hole; and
means for attaching said lower housing portion to said connector.

3. A housing according to claim 2 wherein said second end wall includes means defining weakened zones outlining knockouts which are selectively removable to form openings for receiving electrical connector devices.

4. A housing according to claim 2 wherein said mounting holes in said mounting tabs are separated by a distance to receive an electrical receptacle.

5. A housing according to claim 1 wherein the height of said first end wall is substantially twice the height of said first side wall and the height of said second end wall is substantially twice the height of said third side wall.

* * * * *